United States Patent [19]

Molnar et al.

[11] Patent Number: 5,224,290

[45] Date of Patent: Jul. 6, 1993

[54] VERSATILE HERB, VEGETABLE, FLOWER AND GROUNDCOVER SOD MAT AND METHOD FOR PROPAGATION

[76] Inventors: Charles J. Molnar; Judith R. Molnar, both of 12 Malvern Ct., Wilmington, Del. 19810

[21] Appl. No.: 716,208

[22] Filed: Jun. 17, 1991

[51] Int. Cl.$^5$ ............................................. A01C 1/04
[52] U.S. Cl. ......................................................... 47/56
[58] Field of Search ................... 47/9, 56, 9 R, 9 C, 47/2 M, 9 P, 9 S, 9 SC, 58

[56] References Cited

U.S. PATENT DOCUMENTS

| | | | |
|---|---|---|---|
| 3,511,694 | 5/1970 | Lippoldt | 117/105.3 |
| 3,516,196 | 6/1970 | Lippoldt | 47/56 |
| 3,557,491 | 1/1971 | Franklin | 47/56 |
| 3,863,388 | 2/1975 | Loads | 47/56 |
| 3,890,739 | 6/1975 | Blackburn | 47/56 |
| 3,914,901 | 8/1975 | Muldner | 47/56 |
| 4,023,506 | 5/1977 | Robey | 47/56 |
| 4,190,981 | 3/1980 | Muldner | 47/9 |
| 4,232,481 | 11/1980 | Chamouland | 47/56 |
| 4,471,569 | 9/1984 | Ahm et al. | 47/56 |
| 4,539,038 | 9/1985 | Gombert | 47/1 R |
| 4,584,790 | 4/1986 | Gaughen | 47/56 |
| 4,786,550 | 11/1988 | McFarland | 428/203 |
| 4,941,282 | 7/1990 | Milstein | 47/56 |

OTHER PUBLICATIONS

Organic Gardening, Sep./Oct. 1990, p. 47 "Something Wild" by Jeff Cox.
Hort Science 18(1): 89–91, 1983 Developing Wild Flower Sods; D. L. Airhart.
Hort Science 12(5): 492–494, 1977 "Production of Ground Covers in a Sod-Like Manner" R. B. Sterrett et al.
Proceedings of International Plant Propagators Society Jan. 25, 1975, pp. 408–412 "Ground Cover Sods . . . " R. B. Sterrett et al.
Delaware Coop. Ext. Service, 1974, Mitchell W. H. et al, "Sod Production on Plastic Netting" pp. 1–2.

*Primary Examiner*—Carl D. Friedman
*Assistant Examiner*—Michele A. VanPatten

[57] ABSTRACT

A new, improved herb, vegetable, flower, and groundcover sod mat suitable for many landscape applications. The improvement comprises growing either plant seeds seedlings, plant plugs, rooted cuttings or root divisions in a planting medium so that the roots of the plant material entangle with a nylon sod reinforcement to form a tough, lightweight, flexible sod mat. The sod mat can be produced in many strengths and weights, with many diverse planting mediums, with multiple species of plants. The nylon sod reinforcement will degrade if it is uncovered by some accident and exposed to sunlight. Sod mats may be sold in roll form or a rectangular mats.

27 Claims, 6 Drawing Sheets

EXPLODED VIEW OF ROOT PENETRATION IN PATTERN BONDED NYLON SPUNBOND FABRIC

NEWLY PLANTED SOD MAT

SOD MAT READY FOR HARVEST

EXPLODED VIEW OF ROOT PENETRATION
IN AREA BONDED NYLON SPUNBOND FABRIC

EXPLODED VIEW OF ROOT PENETRATION IN
PATTERN BONDED NYLON SPUNBOND FABRIC

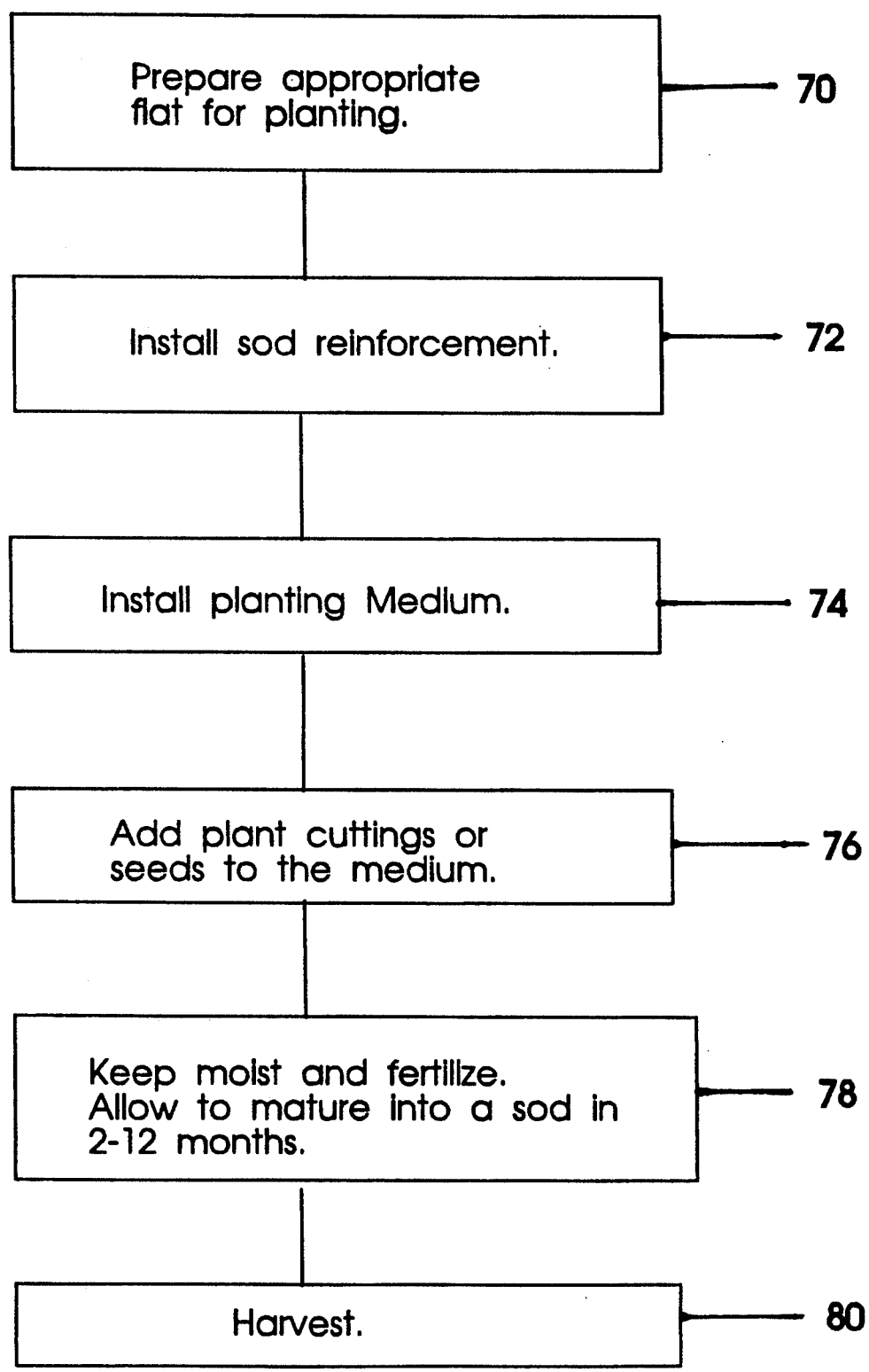
Figure 5. Container Process

Figure 6. Field Grown Process
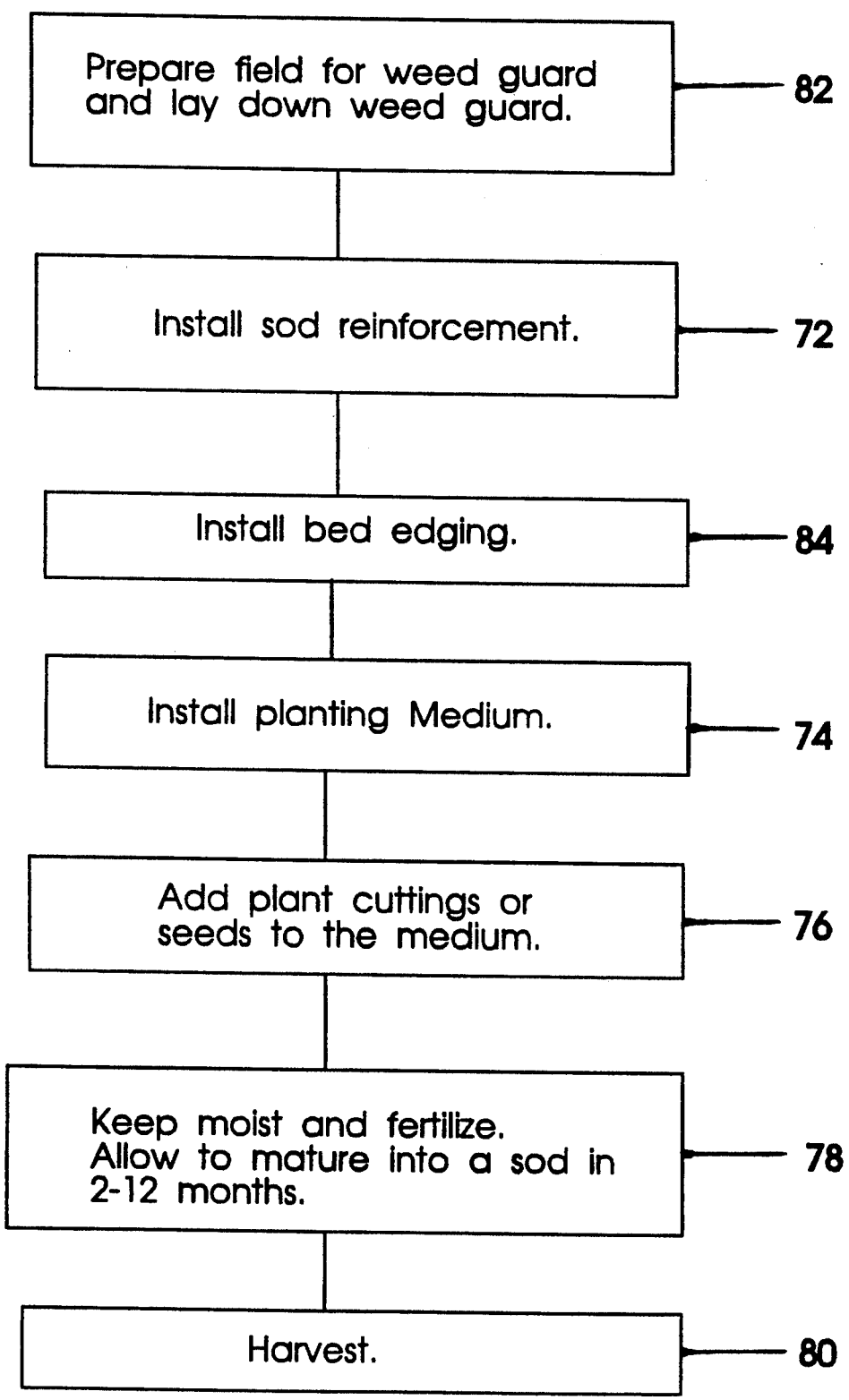

VERSATILE HERB, VEGETABLE, FLOWER AND GROUNDCOVER SOD MAT AND METHOD FOR PROPAGATION

FIELD OF INVENTION

This invention relates to a new, versatile herb, vegetable, flower, and groundcover sod mat for many landscaping or home applications.

BACKGROUND—DESCRIPTION OF PRIOR ART

Flower and grass sod mats have long been used in commercial industry. Reinforced flower and groundcover sod mats were tested in the 1970's. These sod mats have serious commercial limitations for the commercial grower, landscaper or consumer. Some also have environmental limitations.

Many flower and grass sod mats contain ungerminated seeds. Germination and early seeding growth requires adequate rainfall and good soil temperature. In addition, the type of soil is often problematic. Also, many of these seed sod mats require complex, expensive and specialized equipment which makes producing small custom lots difficult and expensive for small landscape jobs. Also, many of these use moisture sensitive glues or other ingredients which may lead to storage or shipping instabilities or even premature germination.

Flower and sod mats grown on a very open plastic netting for sod reinforcement are difficult to completely cover with thin planting mediums, use significant synthetic material per square meter and often have delayed harvest times due to the open structure. Plastic netting which is less open often damages the seedling roots by girdling them.

Flower sod mats grown on known polyester spunbond fabrics are limited because the polyester is not degradable, synthetic plastic consumption per square acre is often higher than needed, and only a limited range of strengths are suitable for good commercial sod mat production. Very low weight polyester spunbond fabrics are not generally commercially available. Higher polyester spunbond fabric weights and strengths retard seedling root penetration. For these reasons, the type of planting medium, planting medium weight, and planting depth are limited for best commercial production.

Thus sod mats heretofore known suffer from a number of disadvantages:

(a) Their manufacture requires expensive, complex equipment. Often this equipment by its nature prevents optimum flower or groundcover production for small landscapers and/or customers.

(b) Sod mats containing seeds only prevent economical production of sod mats of many herb, vegetables, flowers, and groundcover species which are better propagated by cuttings, plant plugs, seedlings or plant divisions and the like.

(c) Sod mats limited to seeds require controlled environmental conditions such as moisture for best germination. This leads to extra dollar, time and convenience expense for the landscaper or customer (if water is available).

(d) Many sod mats are sensitive to moisture and humidity and may prematurely delaminate, decompose, germinate, or fall victim to fungus, diseases, or insects.

(e) Sod mats often contain more synthetic plastic than necessary for reinforcement of the specific flower sod because of limitations in availability of the reinforcement.

(f) Some sod mat reinforcements can only be used in lower strength ranges for good production of sod mats. This limits the species of plant materials which can be economically grown and the general applicability of the resulting sod mat.

(g) Current known polyester sod mat reinforcement will not decompose if exposed to sunlight due to heavy traffic or rain fall and the like, forcing the contractor and/or customer to cut away the unsightly portions and clean up if this occurs.

(h) Known sod mats do not use second quality reinforcement products for production.

(i) Traditional vegetables, herbs, groundcovers, and bedding plants are sold in pots and flats, which consume valuable natural resources for packaging and further add to the society's refuse problem.

(j) Traditional plant pots and flats are required by the grower in many styles and sizes for herbs, vegetables, flowers and groundcovers at considerable expense to the grower for inventory, storage, handling and disposal costs.

OBJECTS AND ADVANTAGES

Accordingly, objects and advantages of the present invention are:

(a) to provide a method of producing sod mats which does not require expensive, complex equipment and which can easily produce small custom lots meeting customers' needs;

(b) to provide a sod mat which can easily use optimum propagation techniques for the herb, vegetable, flower or groundcover species desired;

(c) to provide a sod mat containing viable, healthy seedlings, plant plugs, root divisions, or rooted cuttings with well developed roots for immediate planting;

(d) to provide a sod mat which will not decompose when exposed to high humidities or moisture and thus give excellent storage and shipping characteristics;

(e) to provide a sod mat with the minimum necessary synthetic plastic reinforcement to both conserve natural resources and minimize synthetic plastic addition to our landscapes;

(f) to provide a sod mat reinforcement which contains maximum flexibility in reinforcement strength and hence, maximum utility for many plant species and applications;

(g) to provide a sod mat reinforcement which will decompose if uncovered and exposed to sunlight by some accident;

(h) to provide a sod mat which will efficiently use second quality grade synthetics for reinforcement and hence, reduce the refuse problem;

(i) to provide a flower or groundcover product which dramatically reduces the need for traditional packaging and hence, reduces the refuse problem and reduce production costs;

(j) to provide the grower with a flexible sod mat system of packaging retail sales which reduces his inventory, storage, and handling costs while also reducing the complexity of his inventory needs.

BRIEF DESCRIPTION OF DRAWING FIGURES

A brief description of the figures and reference numerals follows:

FIG. 5 is a block diagram illustrating the container process of the invention.

FIG. 6 is a block diagram illustrating a typical field process of the invention.

REFERENCE NUMERALS IN DRAWINGS

Figure 1:
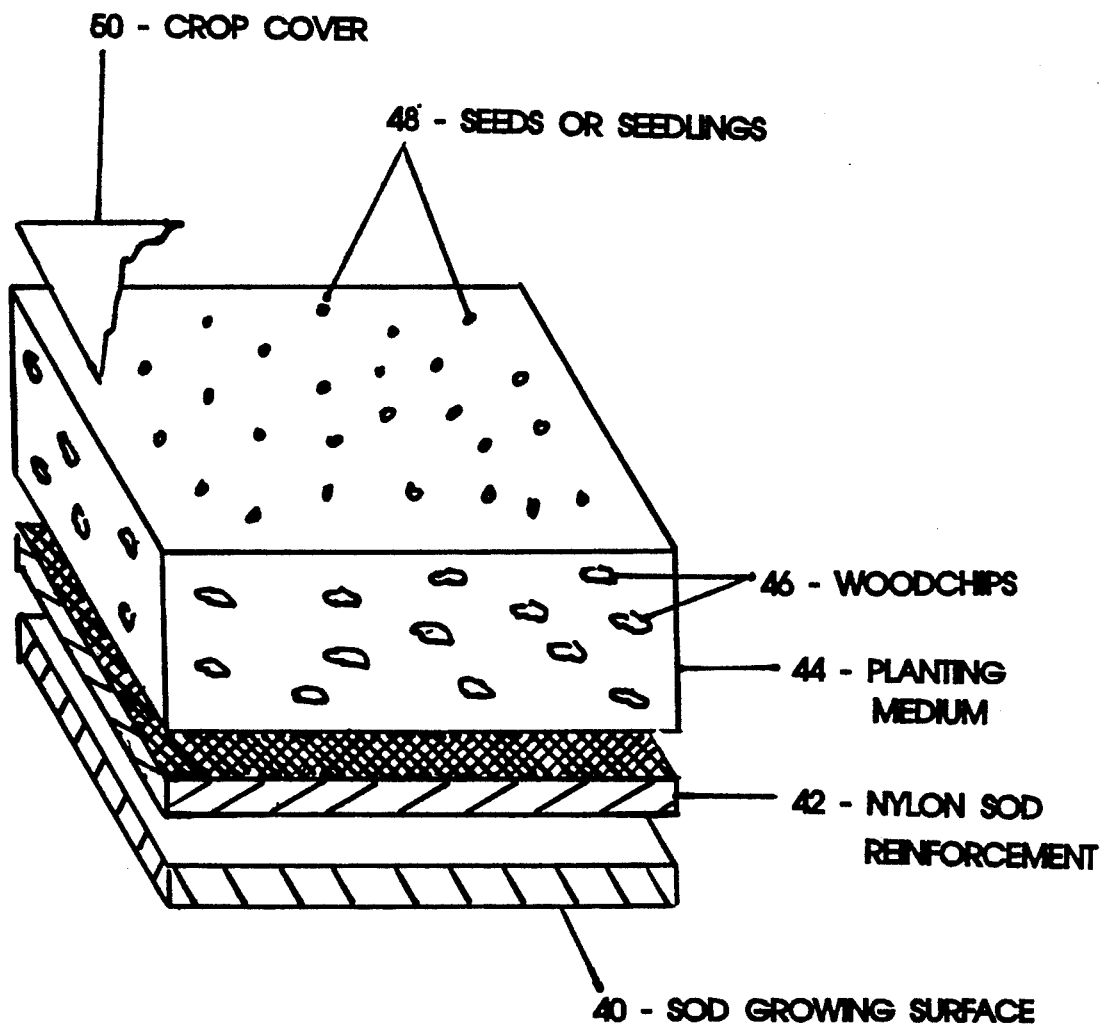
FIG. 1 is a simplified perspective view of newly planted flower sod mat.

40 Surface the sod mat is growing on (usually plastic film)
42 Nylon sod reinforcement
44 Planting medium
46 Woodchips
48 Seeds, plant plugs, seedlings, root divisions, or rooted cuttings
50 Crop cover
52 Mature seedlings, plant plugs, root divisions, or rooted cuttings ready for harvest.
54 Seedling, plant plug, root division, or rooted cutting plant roots
58 Nylon fibers
60 Bonded fiber region
62 Nonbonded fiber region
64 X-direction
66 Y-direction
68 Z-direction
70 Prepare appropriate flat for planting.
72 Install nylon sod reinforcement.
74 Install planting medium.
76 Add seeds, seedlings, plant plugs, root divisions, or rooted cuttings to medium.
78 Keep moist and fertilize. Allow to mature into a sod in 2-12 months.
80 Harvest.
82 Prepare field for weed guard and lay down plastic film weed guard.
84 Install bed edging.

SUMMARY OF THE INVENTION

Our invention is a new, improved plant sod mat comprising a nylon sod reinforcement wherein said nylon sod reinforcement is a pattern bonded, nylon spunbond fabric of less than or equal to 5.0 ounces per square yard or an area bonded, nylon spunbond fabric of less than or equal to 1.0 ounces per square yard and a layer of planting medium on said nylon sod reinforcement and containing viable herb, vegetable, flower, or groundcover seedlings, rooted cuttings, root divisions or plant plugs growing in said planting medium and whose roots penetrate and entangle with said nylon sod reinforcement and thus, form a sod mat. Based on our discovery, we have by figures, explanation, and example shown why nylon sod reinforcements are so effective in producing these new, diverse, and valuable herb, vegetable, flower, and groundcover sod mats. We have also disclosed how to design and produce the most preferable herb, vegetable, flower, and groundcover sod mats.

DESCRIPTION OF PREFERRED EMBODIMENTS—FIGS. 1-4

FIG. 1 is a fragmentary cross section of a typical flower sod mat according to this invention. Reference Numeral 40 is a suitable surface on which to grow sod mats such as 4 mil black polyethylene film mulch or a porous polyethylene sheet such as VISPORE ® manufactured by Tredigar in Richmond, Va. Other suitable surfaces include plywood or a concrete slab. In a field grown application the sod mat growing surface needs to prevent weeds from growing into and through the flower sod mat from the soil below and also to encourage the flower roots to grow laterally and form a sod. In a flat grown application, the thin plastic film can serve to contain the roots and planting medium (Reference Numeral 44) in a flat with a very open bottom and also make sod mat removal easy at harvest time. Reference Numeral 42 is a nylon sod reinforcement consisting of a nylon spunbond fabric such as CEREX ® and PBN II ® marketed by Fiberweb North America Inc. in Greenville, S.C., CEREX ® is an example of an area bonded, nylon spunbond fabric. PBN II ® is an example of a pattern bonded, nylon spunbond fabric. Reference Numeral 44 is the planting medium. The planting medium is adjusted to the optimum depth for the herb, vegetable, groundcover, or flower species of sod mat being grown. FAIRGROW ® is a good growing medium manufactured by Delaware Solid Waste Authority in Wilmington, Del. Reference Numeral 46 represents the demolition woodchips manufactured by Corrado American in Wilmington, Del. and can be added to the planting medium (Reference Numeral 44). Many other planting mediums can also be used. Examples include but are not limited to potting soil, METRO-MIX ® and REDI-EARTH ® manufactured by W. R. Grace. Reference Numeral 48 represents the seeds, seedlings, plant plugs, rooted cuttings, or root divisions added to the planting medium (Reference Numeral 44). Reference Numeral 48 also represents other means of starting plants where appropriate such as cuttings and viable plant material derived from various types of plant tissue culture and thus are meant to be included in the seeds, seedlings, plant plugs, rooted cuttings and root divisions definition above. Seedlings are usually planted in a 10-20 cm grid pattern. Reference Numeral 50 represents an optional crop cover such as REEMAY ® 2006 manufactured by Reemay, Inc in Old Hickory, Tenn. This can serve to warm the soil up quickly in the spring and/or for some protection from marauding animals such as rabbits or birds.

Figure 2:
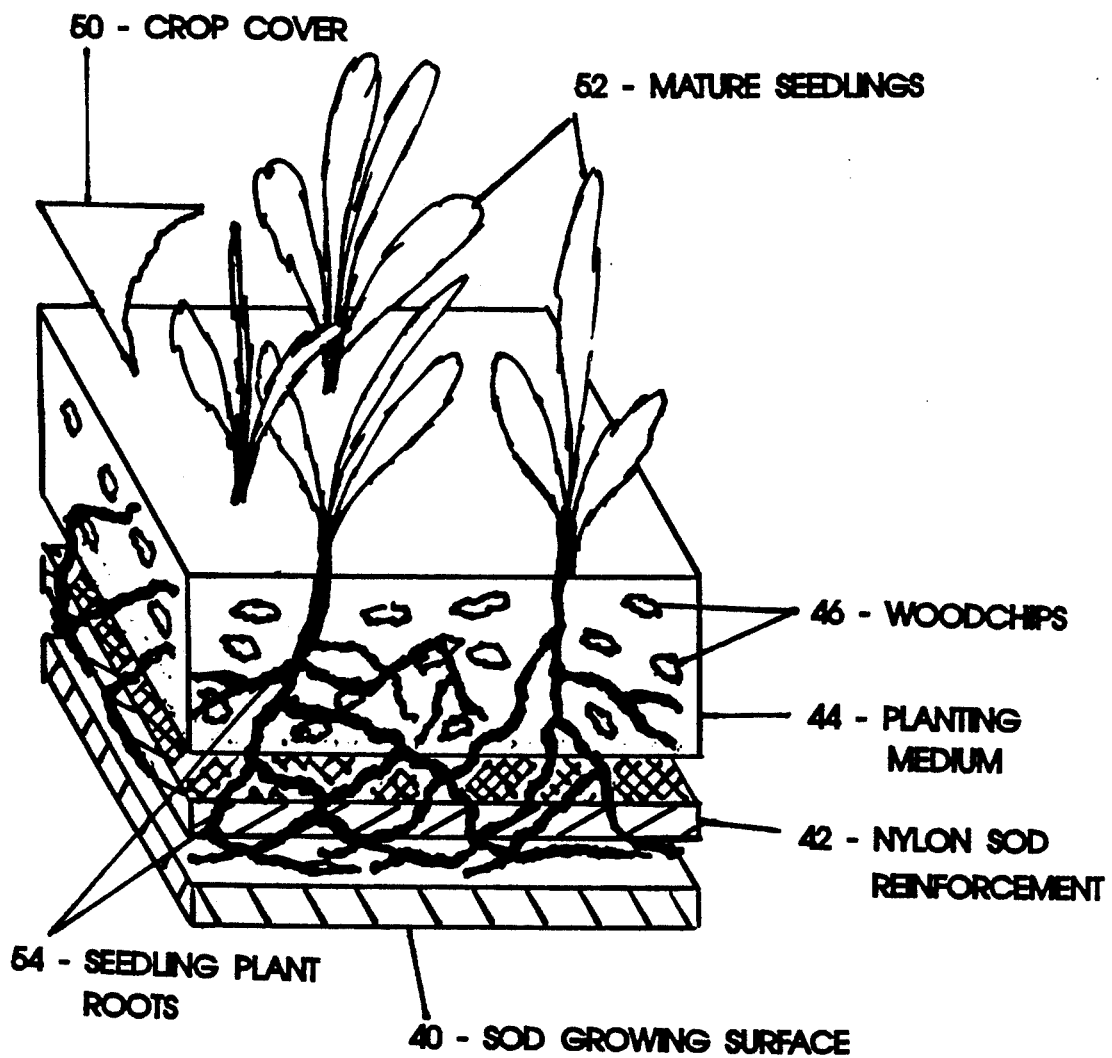
FIG. 2 is a simplified perspective of a seedling sod mat ready for harvest.

FIG. 2 is a fragmentary cross section of a mature sod mat according to this invention. Reference Numeral 44 is the planting medium. Reference Numeral 40 is a suitable surface on which to grow sod mats. Reference Numeral 42 is a nylon sod reinforcement. Reference Numeral 52 depicts the seedlings, root divisions, rooted cuttings, or plant plugs in the planting medium (Reference Numeral 44) ready for harvest. Reference Numeral 54 depicts the roots of the seedling, root divisions, rooted cuttings or plant plugs penetrating and entangled to each other and to nylon sod reinforcement (Reference Numeral 42) and the planting medium (Reference Numeral 44). It is this root penetration and entanglement which makes these sod mats very tough and easy to handle. Reference Numeral 50 is an optional crop cover such as hay for overwinter protection.

We have discovered that the nylon sod reinforcement must permit easy penetration of the root structure and also must have enough tear strength in combination with the root entanglement to permit easy handling of the sod mat without tearing. This is no small task since the sod weights can vary significantly. For instance, liriope spicata generally prefers a 5 cm depth of planting medium. Wildflower mixes usually are grown at a 2.5 cm depth. In addition, different growers, because of availability and price, prefer different planting mediums such as potting soil, humus/wood chip mixture, sphagnum moss and perlite mixture, or other commercially prepared planting mediums such as REDI-EARTH ® or METRO-MIX ®. Each of these planting mediums have different dry densities, they pick up different amounts of water and hence planting medium weights vary by a factor of two or three or more. In addition, it is common to pin sods on slopes greater than 10–20 degrees to prevent the sods from washing down before rooting with the subsoil is complete. Pinning adds an additional stress to the sod reinforcement. In addition to the physical weights, required strengths are also affected by how customers handle the sod mat—some gently and some roughly.

Thus, sod mat reinforcements from very light weights (and low tear strengths) to relatively heavy weights (and high tear strengths) are required for the many different types of customers and customer applications. In addition, the sod mat reinforcement should promote good root wetting for plant growth. We have discovered that both area bonded, nylon spunbond fabrics and pattern bonded, nylon spunbond fabrics are ideal for these applications because they offer exceptional reinforcement flexibility, excellent root wetting, and excellent root penetration. Since nylon will normally degrade if no ultraviolet light stabilizers are added, nylon spunbond fabrics often have the additional advantage of being photodegradable. Both CEREX ® and PBN II ®, are examples of an area bonded, nylon spunbond fabric and a pattern bonded, nylon spunbond fabric, which do not have ultraviolet light stabilizers and thus, will degrade if exposed to the sunlight.

Figure 3:
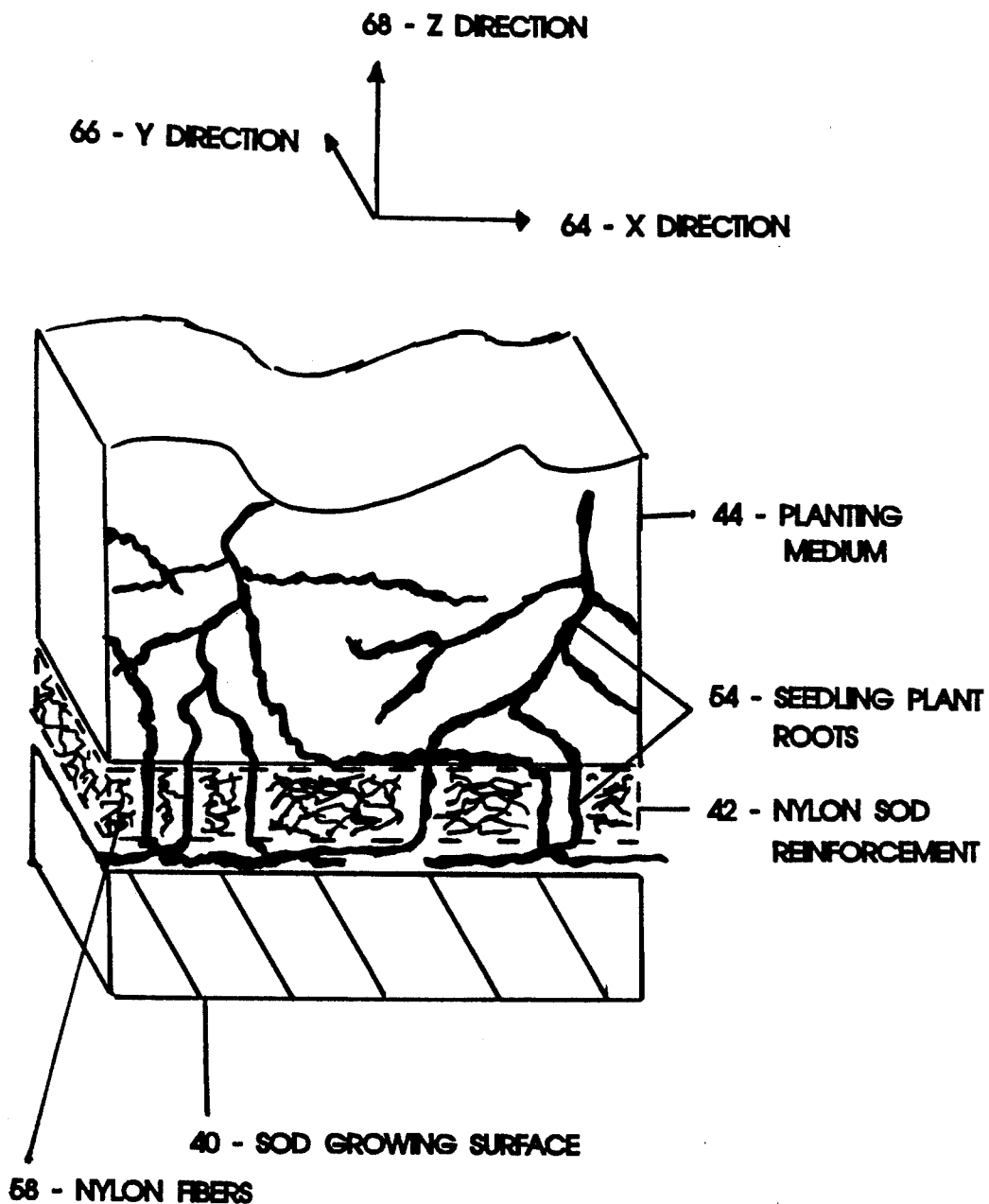
FIG. 3 is an artist's conception of the root penetration in area bonded nylon spunbond fabric.

An example of an area bonded, nylon spunbond fabric is CEREX ®. Area bonding refers to fabrics where the fibers in the fabric (for example, Reference Numeral 58 of FIG. 3) are bonded at essentially all fiber junctions (or cross-over points) to each other. The area bonded nylon fabric family of products offers unique strength to weight ratios, excellent porosity, excellent root wetting characteristics, and photodegradability. They are also commercially available in lower weight per unit area than REEMAY ® polyester spunbond fabrics. FIG. 3 is an artist's conception of the root penetration in area bonded, nylon spunbond fabrics. As the roots (Reference Numeral 54) penetrate the nylon sod reinforcement (Reference Numeral 42), they must either stretch or break the nylon fibers (Reference Numeral 58) to create a large enough hole in the X-direction and Y-direction (Reference Numerals 64 and 66, respectively in FIG. 3) to grow through. Hence as the roots penetrate the area bonded, nylon fabrics, they generally do so in the Z-direction (Reference Numeral 68). They generally do not tear the nylon sod reinforcement (Reference Numeral 42) in the Z-direction (Reference Numeral 68) because the nylon sod reinforcement (Reference Numeral 42) is so thin and because all fibers are bonded together. Area bonded, nylon spunbond fabrics offer numerous advantages over area bonded, polyester spunbond fabrics such as REEMAY ®. First, area bonded nylon fabrics are commercially available in lower weights and tear strengths, second, higher porosity is available than with REEMAY ®, and third, water swell further expands the nylon spunbond fabric and also further weakens it. All of these factors promote easy, rapid seedling root penetration in the nylon sod reinforcement (Reference Numeral 42) and hence, good sod mat production and performance characteristics. Preferable area bonded, nylon spunbond fabrics range in weights from 1.0 opsy to 0.03 opsy and more preferably from 0.7 opsy to 0.03 opsy and most preferably from 0.5 opsy to 0.03 opsy. In preferable ranges, area bonded nylon fabrics offer exceptional tear strengths, photodegradability, excellent root wetting characteristics, and porosity which in combination makes them an exceptionally fine sod mat reinforcement for light weight applications.

Figure 4:
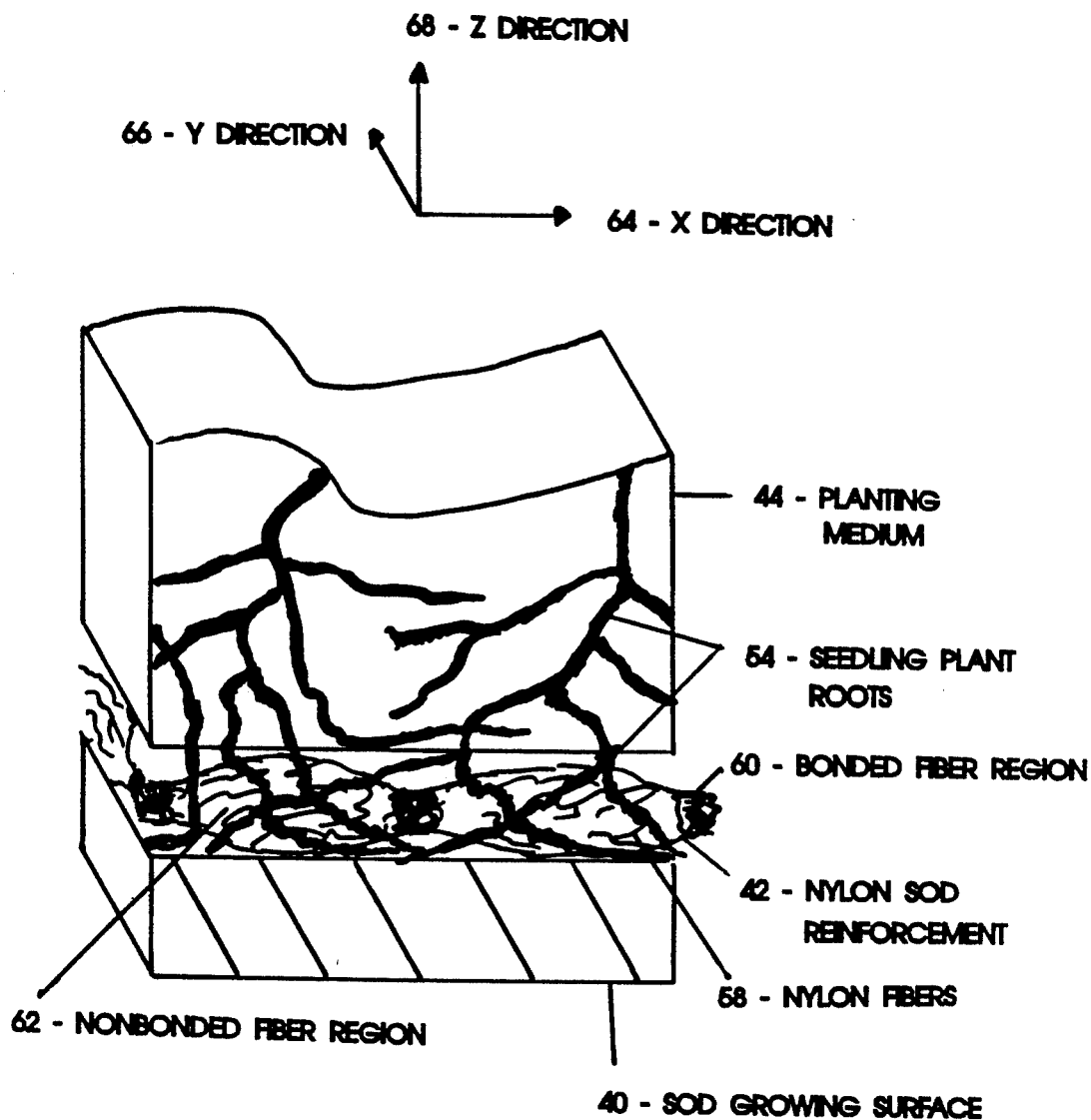
FIG. 4 is an artist's conception of the root penetration in the pattern bonded nylon spunbond fabric.

An example of pattern bonded, nylon spunbond fabric is PBN II ®. Pattern bonding means that only localized regions of the spunbond fabric are bonded and the remaining nonbonded fiber regions contain nylon fibers which can move, entangle and otherwise promote excellent seedling root entanglement to form exceptional sod mats. The area ratio of the nonbonded fiber region (Reference Numeral 62) to the bonded fiber region (Reference Numeral 60) is the nonbonded fiber region's surface area in square centimeters divided by the bonded fiber region's surface area in square centimeters. For example, if a particular pattern bonded, nylon spunbond fabric has a total area of 110 square centimeters of which the surface area of the nonbonded fiber region (Reference Numeral 62) is 100 square centimeters and the surface area of the bonded fiber region (Reference Numeral 60) is 10 square centimeters, then the area ratio of nonbonded fiber region to the bonded fiber region is 10/1. This area ratio is preferably less than 1000/1. Pattern bonded nylon fabrics function well as a nylon sod reinforcement (Reference Numeral 42) at both very low tear strengths and surprisingly high tear strengths. Additional advantages include excellent porosity, root wetting characteristics, and as with most nylon, the elongation increases and the strength decreases when wet which promotes excellent root penetration and entanglement. FIG. 4 is an artist's conception of the root penetration in pattern bonded nylon fabrics. It is our believe that most of the roots (Reference Numeral 54) penetrate the nylon sod reinforcement (Reference Numeral 42) in the nonbonded fiber regions (Reference Numeral 62) and few roots, if any, penetrate in the bonded fiber regions (Reference Numeral 60). In addition, in the nonbonded fiber regions, since the roots can grow between and entangle individual fibers in a random fashion in all directions (Reference Numerals 64, 66, and 68), the seedlings tend to displace or mechanically tear the nylon fibers (Reference Numeral 58) in the pattern bonded nylon fabrics in the X-direction, Y-direction, and Z-direction (Reference Numeral 64, 66, and 68, respectively in FIG. 4). The three dimensional displacement and tearing of the nylon fibers (Article 58) has several important advantages—easier, faster root penetration and better root entanglement to bond the nylon sod reinforcement (Reference Numeral 42) and planting medium (Reference Numeral 44) together. Together, these advantages translate into dramatically improved production and performance characteristics. In mature, transplanted sods (2 or more years) as the roots (Reference Numeral 54) grow and expand, the pattern bonded nylon fabric will be torn in all directions (Reference Numerals 64, 66 , and 68) allowing it to more easily be assimilated into the surrounding soil and generally improving environmental friendliness. For these reasons, if a grower needs to use a very dense planting medium (Reference Numeral 44), needs to grow seedlings which need a deep planting medium or needs to harvest the product while it is very wet, then strong pattern bonded nylon fabrics are the best choice. Certain applications will also require the photodegradability and environmental friendliness of this family. Preferable pattern bonded, nylon spunbond fabrics range in fabric weight from 5.0 opsy to 0.03 opsy and more preferably from 1.0 opsy to 0.03 opsy and even more preferably from 0.5 opsy to 0.03 opsy. The area ratio of the nonbonded fiber region to the bonded fiber region is preferably greater than or equal to 2/1, more preferably greater than or equal to 4/1, and even more preferably greater than or equal to 9/1. In preferable ranges, pattern bonded, nylon spunbond fabrics offer an exceptionally broad range of tear strengths, photodegradability, excellent root wetting characteristics, porosity, and environmentally friendly characteristics which in combination makes them an exceptionally fine sod mat reinforcement for numerous sod mat applications.

PROCESS DESCRIPTION

In FIG. 5, there is shown a block diagram illustrating the general process of growing herb, vegetable, flower, or groundcover sod mats in a container according to this invention. The six generalized steps are: (1) the step 70 of selecting an appropriate flat for growing the herb, vegetable, flower, or groundcover sod. Generally the flat is from 5-10 cm deep, about 25-40 cm wide and 50-70 cm long. Size is selected based on the depth the flowers need to grow efficiently and on overall weight. Weight is generally held to a carrying weight of 10-30 kgs. If a bottom suitable for roots to grow on is not inherent in the flat design, a separate layer of plastic film (such as VISPORE ® or one of numerous black plastic film mulches) is installed on the bottom. The plastic film then becomes Reference Numeral 40 and serves to contain the sod mat roots which penetrate the spunbond fabric installed in the next step. The plastic film also makes removing the sod mat at harvest time easier in many cases. (2) the step 72 consists of installing the nylon sod reinforcement (Reference Numerical 42) on this plastic film or bottom of the flat (Reference Numeral 40). (3) step 74 consists of installing the planting medium (Reference Numeral 44) to the depth required of the herb, vegetable, groundcover, or flower species. (4) step 76 consists of adding the seeds, seedlings, plant plugs, rooted cuttings, or root divisions (Reference Numeral 48) of the desired species to the planting medium (Reference Numeral 44). (5) step 78 consists of normal feeding and care of the seeds, seedlings, rooted cuttings, root divisions or plant plugs (Reference Numeral 48) for maximum growth. This includes watering and fertilizing. MIRACLE-GRO ® manufactured by Stern's Miracle-Gro Products, Inc in Port Washington, N.Y. is a good fertilizer when applied at an approximate concentration of one half teaspoon per gallon and a frequency of about every other week. One needs to take care not to over or under water the medium. A flat which drains and uses porous polyethylene is often advantageous. (6) step 80 consists of harvesting the sod by removing the sod mat from the flat and sealing as a herb, vegetable, groundcover, or flower sod mat. If a plastic film was used in the flat, it is also removed from the sod mat before final planting.

FIG. 6 is a block diagram illustrating the general process for growing groundcover or flower mats in a field according to this invention. The seven general steps are: (1) Step 82 consists of preparing the field beds by tilling the soil, removing any major weeds left, and then grade and smooth out. Lay down a plastic weed guard barrier such as 4 mil black polyethylene film or suitable porous polyethylene film (Reference Numeral 40). Normally, rows 8 ft wide by 100-200 ft long are used. Aisles 3 ft wide are left between the rows for access and are mulched heavily with wood chips to prevent weed growth. (2) in step 72 the nylon sod reinforcement (Reference Numeral 42) is laid on top of the plastic film (Reference Numeral 40 shown in the preceding FIG. 1). (3) step 84 consists of installing a raised bed railing of 4" by 4" rot resistant treated lumber to contain the planting medium (Reference Numeral 44) and prevent weed encroachment on the flower beds. (4) step 74 consists of laying the planting medium (Reference Numeral 44) down to the preferred planting depth for the specific plants. Examples include 5 cm deep for liriope spicata, 5 cm deep for houttuynia, 2.5 cm deep for aegopodium, 2.5 cm for creeping phlox and 2.5 cm for Thyme. An example of a growing medium is a mixture of 70% FAIRGROW ® manufactured by Delaware Solid Waste Authority in Wilmington, Del. and 30% demolition wood chips manufactured by Corrado American in Wilmington, Del. (5) step 76 consists of adding the seeds, seedlings, plant plugs, rooted cuttings or root divisions (Reference Numeral 48) of the desired species to the planting medium (Reference Numeral 44). Liriope is generally planted on a 10 cm grid pattern and ivy is planted on a 25 cm grid pattern. Alternately, a wildflower seed mix has been applied at 0.2-2 lbs per 1000 square feet depending on application and specific mix. (6) step 78 consists of keeping the planting medium moist and fertilizing to assure good germination of the seeds and growth of the plant plugs, rooted cuttings, root divisions, seedlings or germinated seeds. Automated irrigation systems marketed by Buckner, Inc. manufactured in Fresno, Calif. work well for this purpose. If desired for environmental control reasons, common crop covers (Reference Numeral 50) such as REEMAY ® 2006 may be used to protect newly planted seeds from foraging birds or, alternately to warm the soil in the spring. Common crop covers (Reference Numeral 50) such as REEMAY ® 2006 or hay may also be used in the fall to help protect from snow damage. Allow sod to mature for 2-12 months. (7) step 80 consists of harvesting the sod mats. The sod mats may be harvested in rectangles of generally 25 to 40 cm by 40 cm to 100 cm. The dimensions usually are adjusted to keep the sod rectangle between 10 and 35 kgs. Alternately with most plants, the sod mats may be rolled up on 3" or 4" Schedule 40 PVC plumbing pipe in widths of 4'. Generally, sods less than 3 cm thick are harvested in rolls. The plastic film (Reference Numeral 40) is removed before sale.

EXAMPLES

The following experimental examples, along with the reference physical properties in Table I below, will serve to further explain the invention and demonstrate the advantages which are attributable thereto:

TABLE I

| Product code | Weight (opsy) | Tear Strength Machine Dir (lbs) | Tear Strength Transverse Dir (lbs) | Air Permeability (cfm/sf) |
| --- | --- | --- | --- | --- |
| PBN II ® | 0.3 | 2.9 | 1.8 | 1350 |

TABLE I-continued

| Product code | Weight (opsy) | Tear Strength Machine Dir (lbs) | Tear Strength Transverse Dir (lbs) | Air Permeability (cfm/sf) |
|---|---|---|---|---|
| PBN II ® | 0.5 | 4.8 | 2.7 | 1100 |
| PBN II ® | 1.0 | 10.0 | 6.0 | 640 |
| PBN II ® | 2.0 | 21.0 | 14. | 250 |
| PBN II ® | 3.0 | 34 | 24 | 180 |
| Cerex ® | 0.3 | 4.6 | 2.6 | 1340 |
| Cerex ® | 0.4 | 5.5 | 3.4 | 1130 |
| Cerex ® | 0.5 | 6.4 | 4.3 | 950 |
| Comparative Examples Follow | | | | |
| Cerex ® | 2.0 | 21 | 15 | 160 |
| REEMAY ® 2033 | 2.9 | 15 | 17.0 | 250 | where:
opsy=ounces per square yard
lbs=pounds
cfm/sf=cubic feet of air per minute per square foot
CEREX ® and PBN II ® are nylon 66
REEMAY ® is a polyester Further details are available in the respective manufacturers' brochures and are so included in this specification by reference. Also included in this specification by reference is the Freundenburg Spunweb Co. in Durham, N.C. product brochures for their LUTRABOND ® nylon and LUTRADUR ® polyester spunbond fabrics.

EXAMPLE 1

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1' of a 70/30 volume/volume mixture of FAIRGROW ®/woodchips using PBN II ® 0.3 opsy weight as the sod reinforcement. The medium was kept uniformly moist and fertilized with MIRACLE-GRO ® at a concentration of ½ teaspoon once every two weeks. The following results were obtained:

| Time (days) | Observations and results |
|---|---|
| 17 | Excellent root penetration starting through the PBN II ® |
| 31 | Excellent root penetration of the PBN II ®, roots are matted below the PBN II ® and some thicker roots are apparent. |
| 48 | Excellent root penetration of the PBN II ®, roots are matted below the PBN II ® and some thicker roots are apparent. |
| 80 | Wildflower sod was transplated and prospered. |

A sample 12 cm by 12 cm section of the sod mat was removed on the 48th day. The roots were carefully shaved off the bottom of the mat (Article 42) with a single edge razor, allowed to dry at ambient conditions, cleaned and then weighed. The root mass weighed 0.3 grams.

EXAMPLE 2

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1' of a 70/30 volume/volume mixture of FAIRGROW ®/woodchips using PBN II ® 0.5 opsy weight as the sod reinforcement. The medium was kept uniformly moist and fertilized with MIRACLE-GRO ® at a concentration of ½ teaspoon per gallon once every two weeks.

The following results were obtained:

| Time (days) | Observations and results |
|---|---|
| 17 | Excellent root penetration starting through the PBN II ® |
| 31 | Excellent root penetration of the PBN II ®, roots are matted below the PBN II ® and some thicker roots are apparent. |
| 48 | Excellent root penetration of the PBN II ®, roots are matted below the PBN II ® and some thicker roots are apparent. |
| 80 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.3 grams.

EXAMPLE 3

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/volume mixture of FAIRGROW ®/woodchips using PBN II ® 1.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | Excellent root penetration starting through the PBN II ® |
| 31 | Excellent root penetration of the PBN II ®, roots are matted below PBN II ® and some thicker roots are apparent. |
| 48 | Excellent root penetration of the PBN II ®, roots are matted below the PBN II ® and some thicker roots are apparent. |
| 80 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.15 grams.

EXAMPLE 4

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/volume mixture of FAIRGROW ®/woodchips using PBN II ® 2.0 opsy weight as the sod reinforcement. The medium was kept uniformly moist and fertilized with MIRACLE-GRO ® at a concentration of one half teaspoon once every two weeks. The following results were obtained:

| Time (days) | Observations and results |
|---|---|
| 17 | Some root penetration beginning through the PBN II ® |

-continued

| Time (days) | Observations and results |
| --- | --- |
| 31 | Some long healthy roots have penetrated the PBN II ® but no matting is apparent. |
| 48 | Significant root mat is apparent although it does not completely cover the PBN II ® |
| 100 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.1 grams.

EXAMPLE 5

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/-volume mixture of FAIRGROW ®/woodchips using PBN II ® 3.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Some root penetration beginning through the PBN II ® |
| 31 | Some long healthy roots have penetrated the PBN II ® and some matting is apparent. |
| 48 | Significant root mat is apparent although it does not completely cover the PBN II ® |
| 100 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.15 grams.

EXAMPLE 6

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/-volume mixture of FAIRGROW ®/woodchips using CEREX ® 0.3 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Excellent root penetration through the CEREX ® and excellent root mat formed on the bottom. Roots appear thick and strong. |
| 48 | Excellent root penetration through the CEREX ® and solid root mat formed below the CEREX ®. Roots appear thick and strong. |
| 80 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.5 grams.

EXAMPLE 7

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/-volume mixture of FAIRGROW ®/woodchips using CEREX ® 0.4 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Excellent root penetration through the CEREX ® and excellent root mat formed on the bottom. |
| 48 | Excellent root penetration through the CEREX ® and good root mat formed below the CEREX ®. Fewer roots appear thick and strong. |
| 80 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.4 grams.

EXAMPLE 8

Using the sod mat propagation technique illustrated in FIG. 5, a wildflower sod consisting of North American Wildflower Mix manufactured by Northrup King Co in Minneapolis, Minn. and 10% sheep fescue was propagated in a flat containing 1" of a 70/30 volume/-volume mixture of FAIRGROW ®/woodchips using CEREX ® 0.5 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Good root penetration through the CEREX ® but roots not matted yet. No thick strong roots apparent. |
| 48 | Excellent root penetration through the CEREX ® and solid root mat formed below the CEREX ®. Roots appear to be thinner than in Example 7 at 48 days. |
| 80 | Wildflower sod was transplated and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.2 grams.

Some other observations on Examples 1-8

In Examples 1-8 preceeding, the 12 cm by 12 cm nylon sod reinforcement of FIG. 1) was also carefully removed from the planting medium (Reference Numeral 44) by slicing the roots carefully and then the integrity of the planting medium (Reference Numeral 44) and root entanglement in the sod medium was checked. In all cases, the "sod" could not hold together even in these small pieces.

EXAMPLE 9

A custom flower mix A1 was prepared with the following species: white yarrow, New England Aster, Bachelor's button, Ox-eye daisey, Lance-leave coreopsis, plains coreopsis, cosmos, purple coneflower, firewheel, Dame's Rocket, Scarlet Flax, Blue Flax, Horse mint, Corn poppy, and Blackeyed Susan using a formula given in the "National Wildflower Research Center's Handbook available from the National Wildflower Research Center, Austin, Tex. Seeding rate was 1 lb per 1000 square feet for Examples 9–12.

Using the sod mat propagation technique illustrated in FIG. 5, this Mix A1 was propagated in a flat containing 1" of a 70/30 volume/volume mixture of FAIR-GROW ®/woodchips using PBN II ® 0.3 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | Excellent root penetration through the PBN II ® is apparent. |
| 31 | Excellent root penetration through the PBN II ® is apparent and good root mat formed below the PBN II ® reinforcement. |
| 100 | Sod mat was transplated and prospered. |

EXAMPLE 10

Using the sod mat propagation technique illustrated in FIG. 5, this Mix A1 was propagated in a flat containing 1" of a 70/30 volume/volume mixture of FAIR-GROW ®/woodchips using PBN II ® 1.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | Good root penetration through the PBN II ® is apparent. |
| 31 | Good root penetration through the PBN II ® is apparent. |
| 100 | Sod mat was transplated and prospered. |

EXAMPLE 11 (COMPARATIVE)

Using the sod mat propagation technique illustrated in FIG. 5, this Mix A1 was propagated in a flat containing 1" of a 70/30 volume/volume mixture of FAIR-GROW ®/woodchips using CEREX ® 2.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | No root penetration through the CEREX ® is apparent. |
| 31 | No root penetration through the CEREX ® is apparent. |

EXAMPLE 12 (COMPARATIVE)

Using the sod mat propagation technique illustrated in FIG. 5, this Mix A1 was propagated in a flat containing 1" of a 70/30 volume/volume mixture of FAIR-GROW ®/woodchips using REEMAY ® 2033 (3.0 opsy weight) as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | No root penetration through the REEMAY ® 2033 is apparent. |
| 31 | No root penetration through the REEMAY ® 2033 is apparent. |

EXAMPLE 13

Using the sod mat propagation technique illustrated in FIG. 5, liriope spicata plugs were added to a flat containing 5 cm of a commercial soiless potting medium REDI-EARTH ® and a PBN II ® 1.0 opsy reinforcement. The lirope was watered and fertilized for 9 months. A healthy sod mat was then harvested from the flat.

EXAMPLE 14

Using the sod mat propagation technique illustrated in FIG. 5, euonymous plugs on a 20 cm grid were added to a flat containing 2.5 cm of a commercial soiless potting medium REDI-EARTH ® and a PBN II ® 1.0 opsy reinforcement. The euonymous was watered and fertilized for 6 months. A healthy sod mat was then harvested from the flat.

EXAMPLE 15

Using the sod mat propagation technique illustrated in FIG. 5, cherry tomato seeds were planted in a flat containing 2.5 cm of a commercial soiless potting medium REDI-EARTH ® and a PBN II ® 0.5 opsy reinforcement. The cherry tomatoes were watered and fertilized for 2 months. A useful sod mat was then harvested from the flat.

SUMMARY, RAMIFICATIONS, AND SCOPE

Accordingly, the reader will see that this invention can be used to economically and flexibility produce custom, high quality plant sod mats for the grower, landscaper and final customer. Many unique advantages are made available to these customers with this invention, such as faster root penetration and entanglement, low equipment costs, economical small volume production costs, and high quality sod mats of many different herbs, vegetables, flowers and groundcovers. Furthermore multiple soil or soiless mediums are practical because of the unique flexibility of the nylon sod reinforcements discovered, and sod mats with viable seedlings, root divisions, rooted cuttings or plant plugs which give instant beautification and make installation easier for the landscaper or homeowner. In addition, unique advantages are offered to both environment and customers by reducing packaging waste, reducing synthetic plastic reinforcement consumption, reducing the synthetic reinforcement planted with the sod along with added advantage of having a reinforcement which will decompose when exposed to light. The strength of the sod mat is tailored to the grower's and landscaper's requirements. The grower receives still more advantages by reducing his need for inventory, storage, disposal and handling costs associated with a complex array of planting pots and flats by using some simple rolls of nylon sod reinforcement which serve multiple plant species.

Although the specification and examples contain many specifications, these should not be construed as limiting the scope of the invention but as merely providing illustrations of selecting some of the presently preferred embodiments of this invention. For example, single species of hard-to establish wildflowers could be grown under controlled conditions until they were large enough to be "released to the wild", that is, installed to form an instant stand of the desired species. Specialty gardens such as "butterfly gardens", "moonlight gardens" or herb gardens could be sold in a compact, established form, cut up, and easily installed by the customer. Nylon spunbond fabrics which are off specification for many reasons could be used efficiently in this process—even small sizes which may be overlapped and "stitched together" by root penetration. Various known technologies may be combined with this invention such as automating the production of these sod mats for greenhouses, cooling the sod mat to dormancy for storage or shipping purposes, using various commercial soil wetting agents and hydrogels, and using commercial slow release fertilizers.

Thus the scope of the invention should be determined by the appended claims and their legal equivalents, rather than by examples given.

We claim:

1. A new and improved plant sod mat comprising the following:
   a) a nylon sod reinforcement wherein said nylon sod reinforcement is a pattern bonded, nylon spunbond fabric of from 5.0–0.03 opsy or an area bonded, nylon spunbond fabric of from 1.0–0.03 opsy;
   b) a layer of planting medium on said nylon sod reinforcement;
   c) viable herb, vegetable, flower or groundcover seedlings, rooted cuttings, root divisions, or plant plugs growing in said planting medium and whose roots penetrate and entangle with said nylon sod reinforcement and thus, form a sod mat.

2. A sod mat of claim 1 wherein said nylon sod reinforcement is ultraviolet light degradable.

3. A sod mat according to claim 1 wherein said seedlings, rooted cuttings, root divisions, or plant plugs comprise flower and groundcover species.

4. A sod mat of claim 1 wherein said nylon sod reinforcement is from about 1.0–0.03 opsy.

5. A sod mat according to claim 4 wherein said seedlings, rooted cuttings, root divisions, or plant plugs comprise flower and groundcover species.

6. A sod mat according to claim 4 wherein said seedlings, rooted cuttings, root divisions, or plant plugs comprise herb and vegetable species.

7. A sod mat of claim 1 wherein said nylon sod reinforcement is from about 0.5–0.03 opsy.

8. A new and improved plant sod mat comprising the following:
   a) a nylon sod reinforcement wherein said nylon sod reinforcement is pattern bonded, nylon spunbond fabric of from 5.0–0.03 opsy and the area ratio of the nonbonded fiber region to the bonded fiber region is greater than or equal to 2/1 and less than 1000/1;
   b) a layer of planting medium on said nylon sod reinforcement;
   c) viable herb, vegetable, flower or groundcover seedlings, rooted cuttings, root divisions, or plant plugs growing in said planting medium and whose roots penetrate and entangle with said nylon sod reinforcement and thus, form a sod mat.

9. A sod mat of claim 8 wherein said nylon sod reinforcement is ultraviolet light degradable.

10. A sod mat of claim 8 wherein said nylon sod reinforcement is from about 1.0–0.03 opsy.

11. A sod mat of claim 8 wherein said area ratio is greater than or equal to 4/1 and less than 1000/1.

12. A sod mat of claim 11 wherein said nylon sod reinforcement is from about 3.0–0.3 opsy.

13. A sod mat of claim 8 wherein said area ratio is greater than or equal to 9/1 and less than 1000/1.

14. A sod mat of claim 13 wherein said nylon sod reinforcement is from about 3.0–0.3 opsy.

15. A sod mat of claim 13 wherein said seedlings, rooted cuttings, root divisions, or plant plugs comprise flower and groundcover species.

16. A sod mat of claim 13 wherein said seedlings, rooted cuttings, root divisions, or plant plugs comprise herb and vegetable species.

17. A sod mat of claim 8 wherein said area ratio is from about 2/1–10/1.

18. A new and improved plant sod mat comprising the following:
   a) a nylon sod reinforcement wherein said nylon sod reinforcement is a pattern bonded, nylon spunbond fabric of from about 5.0–0.3 opsy or an area bonded, nylon spunbond fabric of about 1.0–0.3 opsy.
   b) a layer of planting medium on said nylon sod reinforcement;
   c) viable herb, vegetable, flower or groundcover seedlings, rooted cuttings, root divisions, or plant plugs growing in said planting medium and whose roots penetrate and entangle with said nylon sod reinforcement and thus, form a sod mat.

19. A sod mat according to claim 18 wherein said nylon sod reinforcement is pattern bonded, nylon spunbond fabric of from about 3.0–0.3 opsy.

20. A sod mat according to claim 18 wherein said nylon sod reinforcement is from about 1.0–0.3 opsy.

21. A new and improved plant sod mat comprising:
   a) a layer of planting medium;
   b) viable herb, vegetable, flower, or groundcover seedlings, rooted cuttings, root divisions or plant plugs growing in said planting medium with well developed roots;
   c) a means for reinforcing said planting medium with said viable herb, vegetable, flower, or groundcover seedlings, rooted cuttings, root divisions or plant plugs growing in said planting medium comprising a nylon sod reinforcement wherein said nylon sod reinforcement comprises an area bonded, nylon spunbond fabric or a pattern bonded, nylon spunbond fabric which promotes good root penetration and entanglement from said herb, vegetable, flower or groundcover plants forming a sod mat.

22. A new and improved sod mat of claim 21 wherein said nylon sod reinforcement comprises a pattern bonded, nylon spunbond fabric.

23. A new and improved sod mat of claim 21 wherein the nylon sod reinforcement is ultraviolet light degradable.

24. An improved method of propagating herb, vegetable, flower and groundcover sod mats comprising:
  a. Prepare sod growing surface;
  b. place a nylon sod reinforcement on top of said sod growing surface wherein said nylon sod reinforcement comprises a pattern bonded, nylon spunbond fabric or an area bonded, nylon spunbond fabric;
  c. place a layer of planting medium on said nylon sod reinforcement;
  d. place viable seeds, seedlings, rooted cuttings, root divisions, or plant plugs in the planting medium comprising herb, vegetable, flower, or groundcover species;
  e. water and nourish said seeds, seedlings, rooted cuttings, root divisions, or plant plugs for growth to establish root penetration and entanglement with said nylon sod reinforcement and, thus form a sod mat for harvest.

25. An improved method of propagating herb, vegetable, flower and groundcover sod mats of claim 24 wherein the nylon sod reinforcement comprises a pattern bonded, nylon spunbond fabric.

26. An improved method of propagating herb, vegetable, flower and groundcover sod mats of claim 24 wherein said seeds, seedlings, rooted cuttings, root divisions, or plant plugs are watered and nourished for about 2-12 months for growth to establish root penetration and entanglement with said nylon sod reinforcement.

27. An improved method of propagating herb, vegetable, flower, and groundcover sod mats of claim 24 wherein the nylon sod reinforcement is ultraviolet light degradable.

* * * * *